United States Patent
Inoue (10) Patent No.: US 10,451,655 B2
(45) Date of Patent: Oct. 22, 2019

(54) COMMUNICATION SYSTEM, HARNESS, AND DETECTION APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka (JP)

(72) Inventor: Masayuki Inoue, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/571,355

(22) PCT Filed: May 10, 2016

(86) PCT No.: PCT/JP2016/063810
§ 371 (c)(1),
(2) Date: Nov. 2, 2017

(87) PCT Pub. No.: WO2016/181948
PCT Pub. Date: Nov. 17, 2016

(65) Prior Publication Data
US 2018/0284157 A1    Oct. 4, 2018

(30) Foreign Application Priority Data

May 13, 2015    (JP) ................................ 2015-098347

(51) Int. Cl.
*G01R 1/00*    (2006.01)
*G01R 11/24*    (2006.01)
(Continued)

(52) U.S. Cl.
CPC ............ *G01R 11/24* (2013.01); *G01F 15/007* (2013.01); *G01R 19/2513* (2013.01);
(Continued)

(58) Field of Classification Search
CPC .... G01R 25/04; G01R 19/2513; G01R 11/24; H04B 3/46; H04B 2203/5458; H04B 2203/5441
See application file for complete search history.

(56) References Cited

U.S. PATENT DOCUMENTS 4,988,949 A * 1/1991 Boenning ............ G01R 31/021
174/115
7,076,374 B2 * 7/2006 Rogovin .............. G01R 31/021
324/520

(Continued)

FOREIGN PATENT DOCUMENTS

JP    H06216799 A    8/1994
JP    2007-036512 A    2/2007
(Continued)

OTHER PUBLICATIONS

Search Report for PCT/JP2016/063810, dated Aug. 2, 2016.
German Office Action, Application No. 11 2016 002 123.2 dated Feb. 4, 2019.

*Primary Examiner* — Thang X Le
(74) *Attorney, Agent, or Firm* — Honigman LLP (57) ABSTRACT

Provided are a communication system and a harness configured to detect a connection of an unauthorized apparatus to a communication line. In a communication system in which a plurality of communication apparatuses perform communication via communication lines, a communication line includes conductive wires for transferring signals and a cover portion that covers the conductive wires. The communication system includes a detection unit for detecting whether or not the cover portion has been removed. If
(Continued)

removal of the cover portion of the communication line is detected by the detection unit, it can be determined that an unauthorized apparatus is connected to the communication line.

12 Claims, 5 Drawing Sheets

(51) Int. Cl.
    *H04B 3/46*     (2015.01)
    *G01F 15/00*     (2006.01)
    *H04L 29/06*     (2006.01)
    *G01R 19/25*     (2006.01)
    *G01R 25/04*     (2006.01)

(52) U.S. Cl.
    CPC ............... *G01R 25/04* (2013.01); *H04B 3/46* (2013.01); *H04L 63/10* (2013.01); *H04B 2203/5441* (2013.01); *H04B 2203/5458* (2013.01)

(56) References Cited

U.S. PATENT DOCUMENTS

| | | | |
|---|---|---|---|
| 7,902,832 B2 | 3/2011 | Shimamura et al. | |
| 8,593,153 B2* | 11/2013 | Medelius | H01B 1/04 324/543 |
| 8,909,173 B2* | 12/2014 | Harmke | H04M 1/72547 455/3.06 |
| 2004/0160331 A1* | 8/2004 | Chiu | G01R 31/021 340/673 |
| 2005/0231877 A1* | 10/2005 | Komatsu | H01H 1/605 361/103 |
| 2006/0061368 A1* | 3/2006 | Furse | G01R 31/11 324/519 |
| 2014/0123327 A1 | 5/2014 | Takahashi | |

FOREIGN PATENT DOCUMENTS

| | | |
|---|---|---|
| JP | 2010-287337 A | 12/2010 |
| JP | 2013-223527 A | 10/2013 |
| JP | 2014-143631 A | 8/2014 |

\* cited by examiner

COMMUNICATION SYSTEM, HARNESS, AND DETECTION APPARATUS

CROSS-REFERENCE TO RELATED APPLICATIONS

This application is the U.S. national stage of PCT/JP2016/063810 filed May 10, 2016, which claims priority of Japanese Patent Application No. JP 2015-098347 filed May 13, 2015.

TECHNICAL FIELD

The present invention relates to a communication system, a harness, and a detection apparatus that are capable of detecting connection of an unauthorized apparatus to a communication line in a communication system in which a plurality of communication apparatuses perform communication via communication lines.

BACKGROUND

Conventionally known is a detection apparatus that is capable of detecting connection of an unauthorized apparatus to a communication line in a system in which a plurality of communication apparatuses perform communication via communication lines. JP 2014-143631A discloses an unauthorized connection detection system in which a predetermined voltage is applied to a communication line, a voltage on the communication line is detected, and it is determined whether or not a regular (authorized) tool is connected thereto based on the detected voltage.

Also, JP 2015-5829A discloses a connection detection apparatus for acquiring information on the waveform of a signal that is transmitted or received with a communication line, compares the acquired waveform with a normal communication waveform, and detects connection of an apparatus to the communication line in accordance with the comparison result.

In the unauthorized connection detection system in JP 2014-143631A, if the detected voltage is higher than a usual voltage by about a predetermined voltage, it is determined that a regular tool is connected to the communication line, but in a state in which a regular tool is connected thereto, it is not possible to detect unauthorized connections when an unauthorized apparatus is connected thereto.

In order to acquire information on the waveform of a signal, the connection detection apparatus in JP 2015-5829A needs an apparatus for measuring a signal voltage level at a temporal resolution that is sufficiently short compared to the transfer rate of an oscilloscope or the like, and thus, if such an apparatus is provided in a communication apparatus, then an issue arises that the size of the communication apparatus and its cost will increase.

The present invention was made in light of these circumstances, and an object of the present invention is to provide a communication system, a harness, and a detection apparatus that are capable of easily detecting connection of an unauthorized apparatus to a communication line.

SUMMARY

In a communication system according to the present invention, a plurality of communication apparatuses perform communication via communication lines, and the communication lines include a conductive wire for transferring a signal and a cover portion that covers the conductive wire, and the communication system includes a detection unit for detecting whether or not the cover portion has been removed.

In the communication system according to the present invention, the detection unit is provided in at least one of the plurality of communication apparatuses.

In the communication system according to the present invention, the cover portion includes a first insulating member that coats the conductive wire and a first conductive member that covers the first insulating member.

In the communication system according to the present invention, a voltage is applied to the first conductive member, and the detection unit detects whether or not the cover portion has been removed, by measuring a voltage of the first conductive member.

In the communication system according to the present invention, the detection unit includes a voltage measurement unit for measuring the voltage of the first conductive member and a pull-down resistor connected to an input port of the voltage measurement unit, the pull-down resistor is connected to the first conductive member, in the plurality of communication apparatuses, any communication apparatus that does not include the detection unit is provided with a pull-up resistor, and a voltage is applied to the first conductive member via the pull-up resistor.

In the communication system according to the present invention, the detection unit includes a voltage measurement unit for measuring the voltage of the first conductive member and a pull-up resistor connected to an input port of the voltage measurement unit, a voltage is applied to the first conductive member via the pull-up resistor, in the plurality of communication apparatuses, any communication apparatus that does not include the detection unit is provided with a pull-down resistor, and the pull-down resistor is connected to the first conductive member.

In the communication system according to the present invention, the cover portion further includes a second insulating member that covers an outer circumference of the first conductive member, and a second conductive member that covers an outer circumference of the second insulating member.

In the communication system according to the present invention, a voltage is applied to the second conductive member, and the detection unit detects whether or not the cover portion has been removed, by measuring a voltage of the second conductive member.

In the communication system according to the present invention, the detection unit includes a voltage measurement unit for measuring the voltage of the second conductive member and a pull-down resistor connected to an input port of the voltage measurement unit, the pull-down resistor is connected to the second conductive member, in the plurality of communication apparatuses, any communication apparatus that does not include the detection unit is provided with a pull-up resistor, and a voltage is applied to the second conductive member via the pull-up resistor.

In the communication system according to the present invention, the detection unit includes a voltage measurement unit for measuring the voltage of the second conductive member and a pull-up resistor connected to an input port of the voltage measurement unit, a voltage is applied to the second conductive member via the pull-up resistor, in the plurality of communication apparatuses, any communication apparatus that does not include the detection unit is provided with a pull-down resistor, and the pull-down resistor is connected to the second conductive member.

The communication system according to the present invention includes a notification unit for giving a notification if the detection unit detects removal of the cover portion.

The communication system according to the present invention includes a wireless transmission unit for performing wireless transmission to the outside if the detection unit detects removal of the cover portion.

The communication system according to the present invention includes a stop unit for stopping communication performed by at least one of the plurality of communication apparatuses if the detection unit detects removal of the cover portion.

In the communication system according to the present invention, one of the plurality of communication apparatuses is connected to other communication apparatuses in the plurality of communication apparatuses via the plurality of communication lines, and serves as a gateway apparatus for relaying communication between the plurality of communication lines, and the detection unit is provided in the gateway apparatus.

In a harness according to the present invention obtained by bundling a plurality of covered electric wires, at least one of the covered electric wires includes a conductive wire for transferring a signal, a first insulating member that coats the conductive wire, and a first conductive member that covers the first insulating member.

In the harness according to the present invention, at least one of the covered electric wires further includes a second insulating member that covers an outer circumference of the first conductive member, and a second conductive member that covers an outer circumference of the second insulating member.

A detection apparatus according to the present invention is connected to communication lines with which the plurality of communication apparatuses perform communication, and the communication lines include a conductive wire for transferring a signal and a cover portion that includes an insulating member that coats the conductive wire and a conductive member that covers the insulating member, and the detection apparatus includes a detection unit for detecting whether or not the cover portion has been removed, by measuring the voltage applied to the conductive member.

In the present invention, the conductive wire and the cover portion that covers the conductive wire constitute a communication line, and the detection unit detects whether or not the cover portion has been removed. If an unauthorized apparatus is connected to a communication line, it is necessary to remove a cover portion at a location of the communication line to which the unauthorized apparatus is connected and expose a conductive wire at this location. Thus, if it is detected that the cover portion of the communication line has been removed, it can be determined that the unauthorized apparatus is connected to the communication line.

In the present invention, the communication apparatus internally includes a detection unit, and thus it is possible to detect whether or not a cover portion has been removed, without providing a new apparatus.

In the present invention, the first conductive member covers the first insulating member that coats the conductive wire. Providing the cover portion with the first conductive member makes it possible to electrically detect whether or not the cover portion has been removed.

In the present invention, a voltage is applied to the first conductive member and the voltage of the first conductive member is measured. Because the voltage of the first conductive member changes when the cover portion has been removed, based on whether the voltage of the first conductive member changes, it is possible to detect whether or not the cover portion has been removed. Accordingly, it is possible to detect whether or not the cover has been removed, with a simple configuration.

In the present invention, the detection unit is constituted by the voltage measurement unit and the pull-down resistor that are connected to the first conductive member, any communication apparatus that does not include the detection unit is provided with the pull-up resistor, and a voltage is applied to the first conductive member via the pull-up resistor. With such a configuration, a change in the voltage of the first conductive member caused by removal of the cover portion can be realized with a simple configuration.

In the present invention, the detection unit is constituted by the voltage measurement unit and the pull-up resistor that are connected to the first conductive member, a voltage is applied to the first conductive member via the pull-up resistor, and any communication apparatus that does not include a detection unit is provided with a pull-down resistor connected to the first conductive member. With such a configuration, a change in the voltage of the first conductive member caused by removal of the cover portion can be realized with a simple configuration.

In the present invention, the first conductive member is covered with the second insulating member, and the second insulating member is covered with the second conductive member. Providing the first conductive member and the second conductive member makes it possible to electrically detect whether or not the cover portion has been removed and to reduce inflow of electromagnetic noise into the conductive wire for transferring a signal.

In the present invention, in the first conductive member and the second conductive member, a voltage is applied to the second outer conductive member, and the detection unit measures the voltage. Even though electromagnetic noise is produced by an electric current flowing through the second outer conductive member, the electromagnetic noise can be shielded by the first inner conductive member. Accordingly, it is possible to reduce inflow of electromagnetic noise into the conductive wire.

In the present invention, if removal of the cover portion is detected, the notification unit gives a notification. Giving a notification about the removal of the cover portion to a user makes it possible to attract a user's attention and prevent unauthorized usage of the communication system.

In the present invention, if removal of the cover portion is detected, the wireless transmission unit performs wireless transmission to the outside. By wirelessly transmitting the removal of the cover portion to the outside, it is possible to give a notification to an administrator or the like outside the communication system.

In the present invention, if removal of the cover portion is detected, the stop unit stops communication performed by at least one of the plurality of communication apparatuses. By stopping part of or overall communication when the cover portion is removed, it is possible to prevent leakage or manipulation of data in each communication apparatus.

In the present invention, the gateway apparatus connected to a bus on the communication system is provided with the detection unit. Accordingly, with regard to the communication lines of all of the buses, it is possible to detect whether or not the cover portion has been removed, without providing the detection unit in the other communication apparatuses.

In the present invention, a harness is constituted by the covered electric wire including the first conductive member.

In the communication system using such a harness, it is possible to electrically detect whether or not the cover portion has been removed from the covered electric wire.

In the present invention, the harness is constituted by the covered electric wire including the first conductive member and the second conductive member. In the communication system using such a harness, it is possible to reduce inflow of electromagnetic noise into the conductive wire for transferring a signal.

In the present invention, a voltage is applied to the conductive member provided in the cover portion of the communication line, and the voltage of the conductive member is measured. Based on whether the voltage of the conductive member changes, it is possible to detect whether or not the cover portion has been removed.

Advantageous Effects of Invention

According to the present invention, it is possible to provide a communication system, a harness, and a detection apparatus that are capable of easily detecting connection of an unauthorized apparatus to a communication line.

DETAILED DESCRIPTION OF PREFERRED EMBODIMENTS

Hereinafter, the present invention will be specifically described with reference to the drawings showing embodiments.

Embodiment 1

Figure 1:
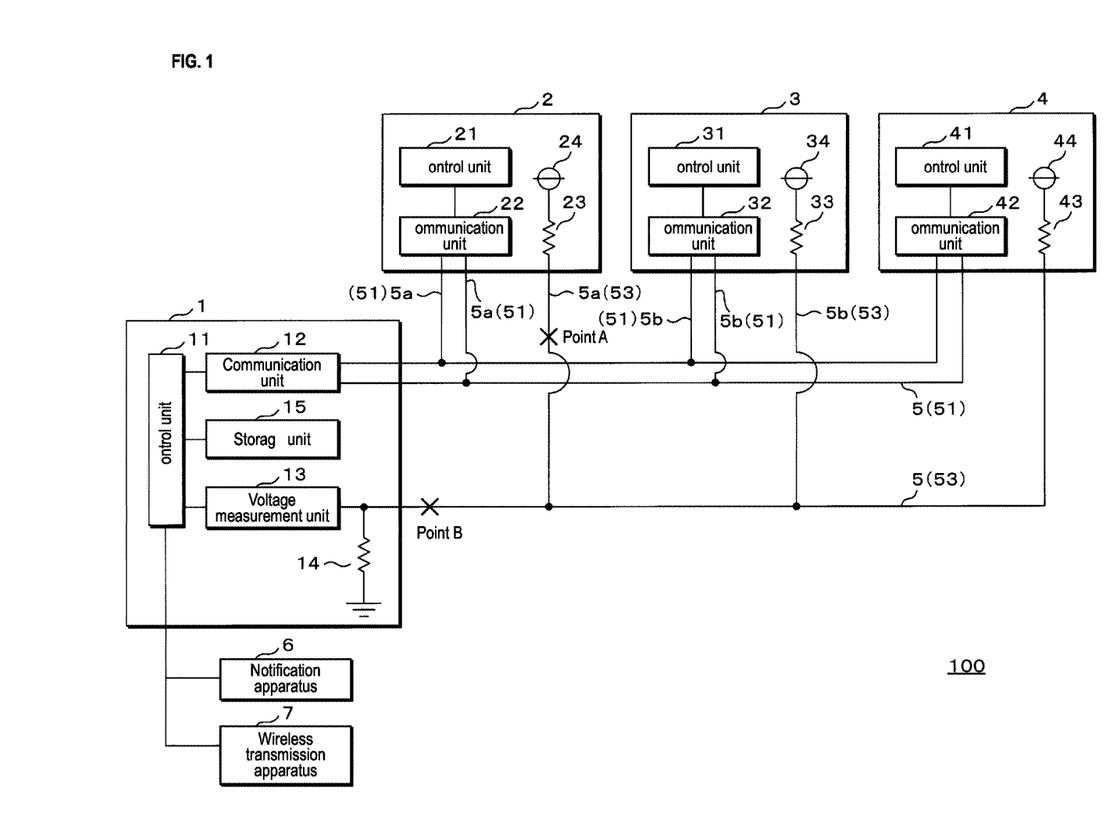
FIG. 1 is a block diagram showing a configuration of a communication system according to Embodiment 1 of the present invention.

FIG. 1 is a block diagram showing a configuration of a communication system 100 according to Embodiment 1 of the present invention. As shown in FIG. 1, the communication system 100 includes four communication apparatuses 1, 2, 3, and 4. The communication apparatuses 1 to 4 perform communication via communication lines 5.

Figure 2:
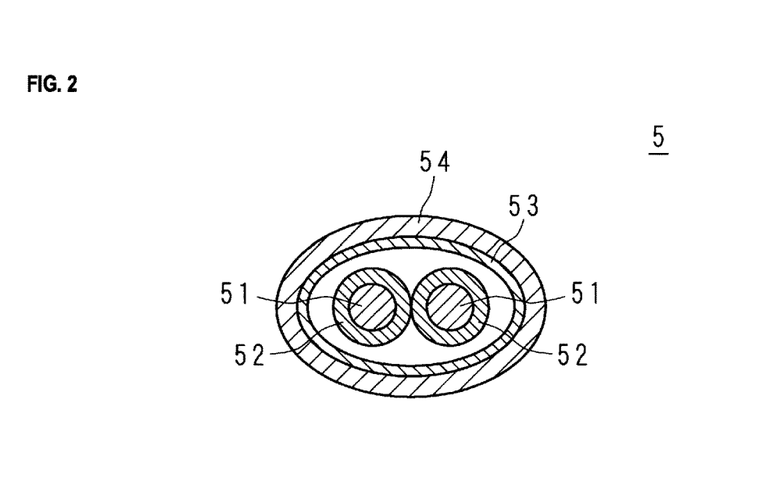
FIG. 2 is a cross-sectional view showing an example of the structure of a communication line in Embodiment 1 of the present invention.

FIG. 2 is a cross-sectional view showing an example of the structure of the communication line 5 in Embodiment 1. The communication line 5 is a covered electric wire including two conductive wires 51 and 51 for transferring signals and cover portions that cover the two conductive wires 51 and 51. That is, the communication system 100 is a two-wire communication system using a differential signal. The cover portion of the communication line 5 includes first insulating members 52 and 52 that individually coat the conductive wires 51 and 51, a first conductive member 53 that covers the first insulating members 52 and 52, and a second insulating member 54 that covers an outer circumference of the first conductive member 53. The first conductive member 53 is constituted by foil of metal such as aluminum or copper, for example.

As shown in FIG. 1, the communication apparatus 1 is connected to the communication lines 5, and includes a control unit 11, a communication unit 12, a voltage measurement unit 13, a pull-down resistor 14, and a storage unit 15.

The control unit 11 is a CPU (central processing unit), an MPU (micro processing unit), or the like, for example, and performs various processes by reading out and executing a control program stored in the storage unit 15 as appropriate. The storage unit 15 has an EEPROM (electrically erasable programmable read only memory), and stores a control program executed by the control unit 11, various data required for processing, and the like, in advance. Also, the storage unit 15 has an SRAM (Static RAM), a DRAM (Dynamic RAM), or the like, and temporarily stores data produced when the control program is executed by the control unit 11. Note that the storage unit 15 may also be a flash memory.

The communication unit 12 is a communication IC (Integrated Circuit), for example, and is connected to the two conductive wires 51 and 51 of the communication lines 5. The communication unit 12 transmits signals to the conductive wires 51 and 51 in response to an instruction received from the control unit 11, and outputs signals received from the conductive wires 51 and 51 to the control unit 11.

An input port of the voltage measurement unit 13 is connected to the first conductive member 53 of the communication line 5. Also, the pull-down resistor 14 is connected to the input port of the voltage measurement unit 13. One end of the pull-down resistor 14 is connected to the first conductive member 53 of the communication line 5, and the other end of the pull-down resistor 14 is grounded. The voltage measurement unit 13 measures the voltage of the first conductive member 53 in response to an instruction received from the control unit 11, and outputs the voltage value to the control unit 11.

The communication apparatus 2 includes a control unit 21 and a communication unit 22. The communication apparatus 2 is connected to the communication lines 5 via communication lines 5a. The communication lines 5a have the same structure as the communication lines 5. The control unit 21 is a CPU, an MPU, or the like, for example, and performs various processes by reading out and executing a control program stored in a storage unit (not shown) as appropriate. The control unit 21 has the function of controlling transmission and reception performed by the communication unit 22, and stopping at least one or all of the communication functions of the communication unit 22.

The communication unit 22 is a communication IC, for example, and is connected to one end of each of the conductive wires 51 and 51 of the communication lines 5a. The other ends of the conductive wires 51 and 51 of the communication line 5a are connected to the conductive wires 51 and 51 of the communication lines 5. The communication unit 22 transmits signals to the conductive wires 51 and 51 in response to an instruction received from the control unit 21, and outputs signals received from the conductive wires 51 and 51 to the control unit 21. Also, the communication unit 22 stops at least one or all of the communication functions in response to an instruction received from the control unit 21.

The communication apparatus 2 is provided with a pull-up resistor 23 and a power source 24. One end of the pull-up resistor 23 is connected to the power source 24, and the other end of the pull-up resistor 23 is connected to one end of the first conductive member 53 of the communication line 5a. The other end of the first conductive member 53 of the communication line 5a is connected to the first conductive member 53 of the communication line 5. The power source 24 applies a voltage to the first conductive member 53 via the pull-up resistor 23.

The communication apparatus 3 includes a control unit 31 and a communication unit 32. The communication apparatus 3 is connected to the communication lines 5 via communication lines 5b. The communication lines 5b have the same structure as the communication lines 5. Here, it is preferable to constitute a harness by bundling the communication lines 5, 5a, and 5b. The control unit 31 is a CPU, an MPU, or the like, for example, and performs various processes by reading out and executing a control program stored in a storage unit (not shown) as appropriate. The control unit 31 has the function of controlling transmission and reception performed by the communication unit 32, and stopping at least one or all of the communication functions of the communication unit 32.

The communication unit 32 is a communication IC, for example, and is connected to one end of each of the conductive wires 51 and 51 of the communication lines 5b. The other ends of the conductive wires 51 and 51 of the communication line 5b are connected to the conductive wires 51 and 51 of the communication lines 5. The communication unit 32 transmits signals to the conductive wires 51 and 51 in response to an instruction received from the control unit 31, and outputs signals received from the conductive wires 51 and 51 to the control unit 31. Also, the communication unit 32 stops at least one or all of the communication functions in response to an instruction received from the control unit 31.

The communication apparatus 3 is provided with a pull-up resistor 33 and a power source 34. One end of the pull-up resistor 33 is connected to the power source 34, and the other end of the pull-up resistor 33 is connected to one end of the first conductive member 53 of the communication line 5b. The other end of the first conductive member 53 of the communication line 5b is connected to the first conductive member 53 of the communication line 5. The power source 34 applies a voltage to the first conductive member 53 via the pull-up resistor 33.

The communication apparatus 4 includes a control unit 41 and a communication unit 42, and is connected to the communication lines 5. The control unit 41 is a CPU, an MPU, or the like, for example, and performs various processes by reading out and executing a control program stored in a storage unit (not shown) as appropriate. The control unit 41 has the function of controlling transmission and reception performed by the communication unit 42, and stopping at least one or all of the communication functions of the communication unit 42.

The communication unit 42 is a communication IC, for example, and is connected to the conductive wires 51 and 51 of the communication lines 5. Also, the communication unit 42 stops at least one or all of the communication functions in response to an instruction received from the control unit 41.

The communication apparatus 4 is provided with a pull-up resistor 43 and a power source 44. One end of the pull-up resistor 43 is connected to the power source 44, and the other end of the pull-up resistor 43 is connected to the first conductive member 53 of the communication line 5. The power source 44 applies a voltage to the first conductive member 53 via the pull-up resistor 43.

Also, the communication system 100 includes a notification apparatus 6 and a wireless transmission apparatus 7 that are connected to the control unit 11 of the communication apparatus 1. The notification apparatus 6 is a display, for example, and performs display in response to an instruction received from the control unit 11. The wireless transmission apparatus 7 has the function of wireless transmission and performs wireless transmission to the outside in response to an instruction received from the control unit 11.

In the communication system 100 having such a configuration, if the communication apparatuses 1 to 4 are normally connected to the communication lines 5 (hereinafter, referred to as "at the time of normal connection"), the voltage value measured by the voltage measurement unit 13 is constant. If an unauthorized apparatus is connected to the communication system 100 (hereinafter, referred to as "at the time of unauthorized connection"), it is necessary to remove a cover portion at a location of the communication line 5, 5a, or 5b to which the unauthorized apparatus is connected, and to expose the conductive wire 51 at this location. Thus, connection of an unauthorized apparatus to the communication line 5, 5a, or 5b can be detected by detecting the removal of the cover portion.

If the cover portion is removed, the first conductive member 53 is disconnected and the voltage value measured by the voltage measurement unit 13 changes with respect to the voltage value at the time of normal connection. For example, let the resistance values of the pull-down resistor 14 and the pull-up resistors 23, 33, and 43 all be R [Ω], and let the voltage values of the power sources 24, 34, and 44 all be V [V]. At the time of normal connection, the voltage value V0 measured by the voltage measurement unit 13 is $V0 = \frac{3}{4} \times V$.

At the time of unauthorized connection, the voltage value measured by the voltage measurement unit 13 is smaller than V0. For example, if the first conductive member 53 is disconnected at a point A in the communication line 5a, a voltage value VA measured by the voltage measurement unit 13 is $VA = \frac{2}{3} \times V$. Also, if the first conductive member 53 is disconnected at a point B of the communication line 5 in the vicinity of the communication apparatus 1, a voltage value VB measured by the voltage measurement unit 13 is VB=0.

In this manner, based on the voltage value of the first conductive member 53 that has been measured by the voltage measurement unit 13, the control unit 11 determines whether or not the voltage of the first conductive member 53 decreases with respect to the voltage at the time of normal connection. Accordingly, in the communication system 100, removal of the cover portion is detected by the control unit 11 and the voltage measurement unit 13 detecting a decrease in the voltage of the first conductive member 53.

In Embodiment 1, the storage unit 15 stores the voltage value V0 at the time of normal connection that has been measured in advance. For example, the control unit 11 compares the voltage value input by the voltage measurement unit 13 with the stored voltage value V0. If the input voltage value is smaller than the voltage value V0, the control unit 11 outputs a predetermined signal to the notification apparatus 6 and the wireless transmission apparatus 7.

If the predetermined signal output from the control unit 11 is input to the notification apparatus 6, the notification apparatus 6 displays that an unauthorized apparatus has been connected, thus notifying the user of the communication system 100 about this. If the predetermined signal output from the control unit 11 is input to the wireless transmission apparatus 7, the wireless transmission apparatus 7 wirelessly transmits, to the outside, the fact that an unauthorized apparatus has been connected and notifies the administrator or the like outside the communication system 100 of the connection.

Also, if the input voltage value is smaller than the voltage value V0, the control unit 11 transmits a predetermined signal to the communication apparatuses 2 to 4 via the communication unit 12. The control unit 21 of the communication apparatus 2 stops at least one or all of the communication functions of the communication unit 22 in accordance with the received predetermined signal. The control unit 31 of the communication apparatus 3 stops at least one or all of the communication functions of the communication unit 32 in accordance with the received predetermined signal. The control unit 41 of the communication apparatus 4 stops at least one or all of the communication functions of the communication unit 42 in accordance with the received predetermined signal.

Figure 3:
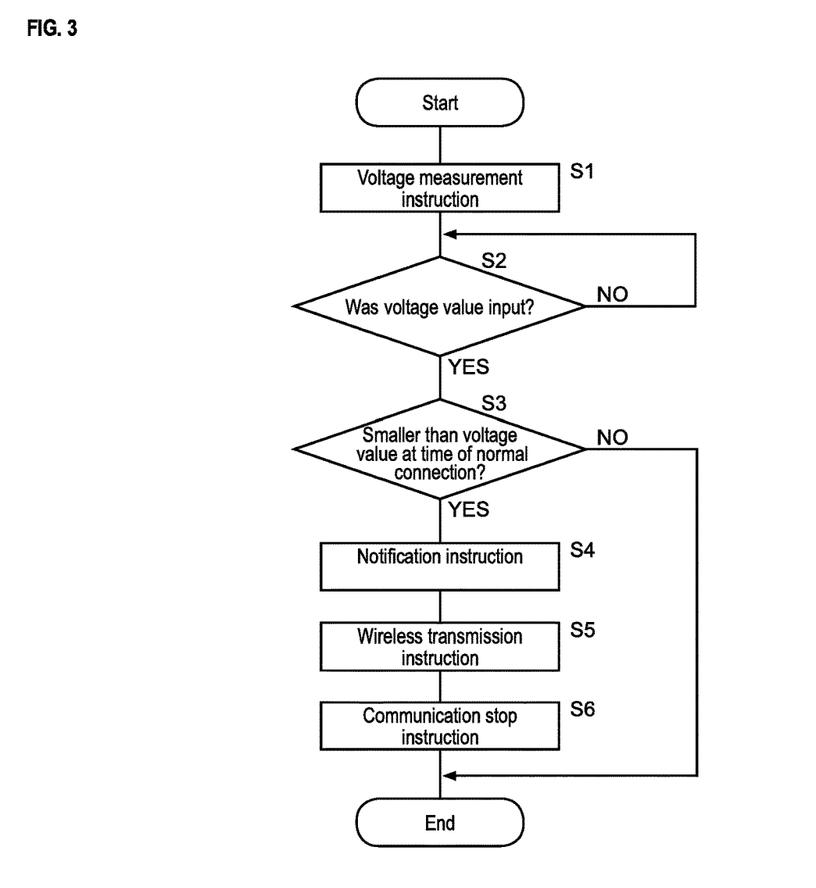
FIG. 3 is a flowchart showing a procedure of detection processing performed by a control unit.

FIG. 3 is a flowchart showing a procedure of detection processing performed by the control unit 11. The control unit 11 performs processing for detecting connection of an unauthorized apparatus to the communication lines 5, 5*a*, and 5*b* in predetermined time intervals, for example. The predetermined time may be set arbitrarily as appropriate.

The control unit 11 outputs a voltage measurement instruction to the voltage measurement unit 13 (step S1). The control unit 11 determines whether or not a voltage value has been input by the voltage measurement unit 13 (step S2). If it is determined that the voltage value has not been input (step S2: NO), the control unit 11 repeats processing of step S2 until the voltage value is input.

If it is determined that the voltage value has been input (step S2: YES), the control unit 11 compares the input voltage with the voltage value V0 at the time of normal connection that is stored in the storage unit 15, and determines whether or not the input voltage is smaller than the voltage value V0 at the time of normal connection (step S3). If it is determined that the input voltage is not smaller than the voltage value V0 at the time of normal connection (step S3: NO), the control unit 11 ends the processing.

If it is determined that the input voltage is smaller than the voltage value V0 at the time of normal connection (step S3: YES), the control unit 11 outputs a notification instruction to the notification apparatus 6 (step S4), and outputs a wireless transmission instruction to the wireless transmission apparatus 7 (step S5).

The control unit 11 outputs a communication stop instruction to the communication apparatuses 2, 3, and 4 via the communication unit 12 (step S6), and ends the processing.

In this manner, in Embodiment 1, a voltage is applied to the first conductive member 53, the voltage of the first conductive member 53 is measured, and removal of the cover portion is detected based on a decrease in the voltage of the first conductive member 53. Accordingly, it is possible to easily detect connection of an unauthorized apparatus to the communication line 5, 5*a*, or 5*b*.

Also, providing the notification apparatus 6 and the wireless transmission apparatus 7 makes it possible to notify the user or the administrator of the communication system 100 of the connection of an unauthorized apparatus, and to prevent unauthorized usage of the communication system 100.

Furthermore, leakage or manipulation of data in the communication apparatuses 2 to 4 cam be prevented by stopping at least one or all of the communication functions of the communication apparatuses 2 to 4.

Embodiment 2

In Embodiment 2, a communication line having a different structure from the communication line 5 in Embodiment 1 is used. In the description below, reference is made to Embodiment 1 with regard to configurations that are similar to those in Embodiment 1 and their description will be omitted.

Figure 4:
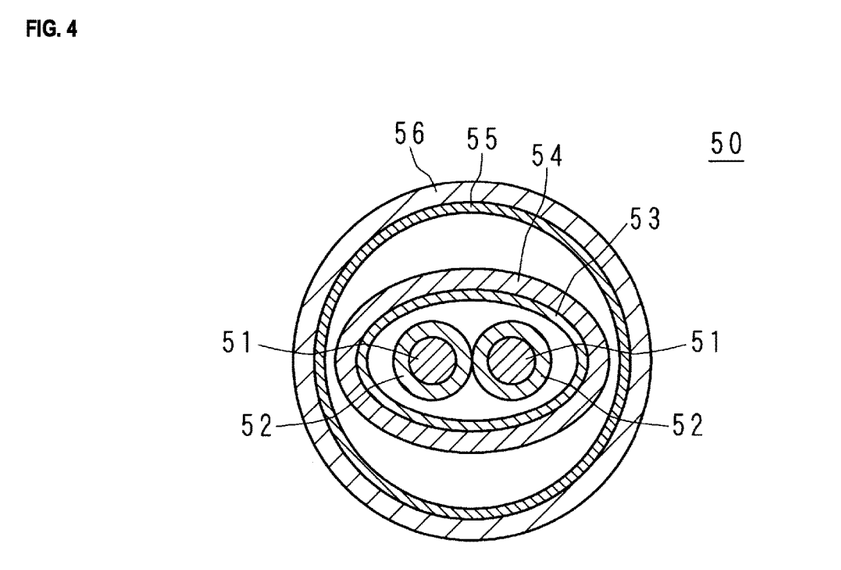
FIG. 4 is a cross-sectional view showing an example of the structure of a communication line in Embodiment 2 of the present invention.

FIG. 4 is a cross-sectional view showing an example of the structure of the communication line 50 in Embodiment 2. The communication line 50 has a structure in which the outer circumference of the communication line 5 in Embodiment 1 is provided with a second conductive member 55 and a third insulating member 56. Specifically, the cover portion of the communication line 50 includes first insulating members 52 and 52, a first conductive member 53, and a second insulating member 54, a second conductive member 55 that covers the outer circumference of the insulating member 54, and a third insulating member 56 that covers the outer circumference of the second conductive member 55. The second conductive member 55 is constituted by foil of metal such as aluminum or copper, for example.

In Embodiment 2, the communication apparatuses 1 to 4 perform communication via the communication line 50. The communication apparatus 1 and the communication apparatus 4 are connected to the communication lines 50, the communication apparatus 2 is connected to the communication lines 50 via communication lines 5*a*, and the communication apparatus 3 is connected to the communication lines 50 via communication lines 5*b*. The communication lines 5*a* and 5*b* have the same structure as the communication line 50. Here, it is preferable to constitute a harness by bundling the communication lines 50, 5*a*, and 5*b*.

In the communication apparatus 1, an input port of the voltage measurement unit 13 is connected to the second conductive member 55 of the communication line 50. Also, a pull-down resistor 14 is connected to the input port of the voltage measurement unit 13. One end of the pull-down resistor 14 is connected to the second conductive member 55 of the communication line 50, and the other end of the pull-down resistor 14 is grounded. The voltage measurement unit 13 measures the voltage of the second conductive member 55 in response to an instruction received from the control unit 11, and outputs the voltage value to the control unit 11.

In the communication apparatus 2, one end of the pull-up resistor 23 is connected to a power source 24, and the other end of the pull-up resistor 23 is connected to one end of the second conductive member 55 of the communication line 5*a*. The other end of the second conductive member 55 of the communication line 5*a* is connected to the second conductive member 55 of the communication line 50. The power source 24 applies a voltage to the second conductive member 55 via the pull-up resistor 23.

In the communication apparatus 3, one end of the pull-up resistor 33 is connected to a power source 34, and the other end of the pull-up resistor 33 is connected to one end of the second conductive member 55 of the communication line 5*b*. The other end of the second conductive member 55 of the communication line 5*b* is connected to the second conductive member 55 of the communication line 50. The power source 34 applies a voltage to the second conductive member 55 via the pull-up resistor 33.

In the communication apparatus 4, one end of the pull-up resistor 43 is connected to the power source 44, and the other end of the pull-up resistor 43 is connected to the second conductive member 55 of the communication line 5. The power source 44 applies a voltage to the second conductive member 55 via the pull-up resistor 43.

That is, in Embodiment 2, the communication line 50 is provided with the first conductive member 53 and the second conductive member 55, a voltage is applied to the second outer conductive member 55 in the first conductive member and the second conductive member, the voltage of the second conductive member 55 is measured, and removal of the cover portion is detected based on a decrease in the voltage of the second conductive member 55. Accordingly, it is possible to easily detect connection of an unauthorized apparatus to the communication line 50, 5a, or 5b.

Also, in Embodiment 2, the first inner conductive member 53 is used as a shield against electromagnetic noise. Accordingly, even if electromagnetic noise is produced by applying a voltage to the second conductive member 55 arranged around the conductive wire 51, the inflow of electromagnetic noise into the conductive wire 51 can be reduced by the first inner conductive member 53 shielding the electromagnetic noise. Therefore, it is possible to reduce its influence on a signal flowing through the conductive wire 51 and to prevent a decrease in the communication quality.

Embodiment 3

In Embodiment 3, connection of a pull-up resistor and a pull-down resistor is different from that in Embodiment 1. In the description below, reference is made to Embodiment 1 with regard to configurations that are similar to those in Embodiment 1 and their further description will be omitted.

Figure 5:
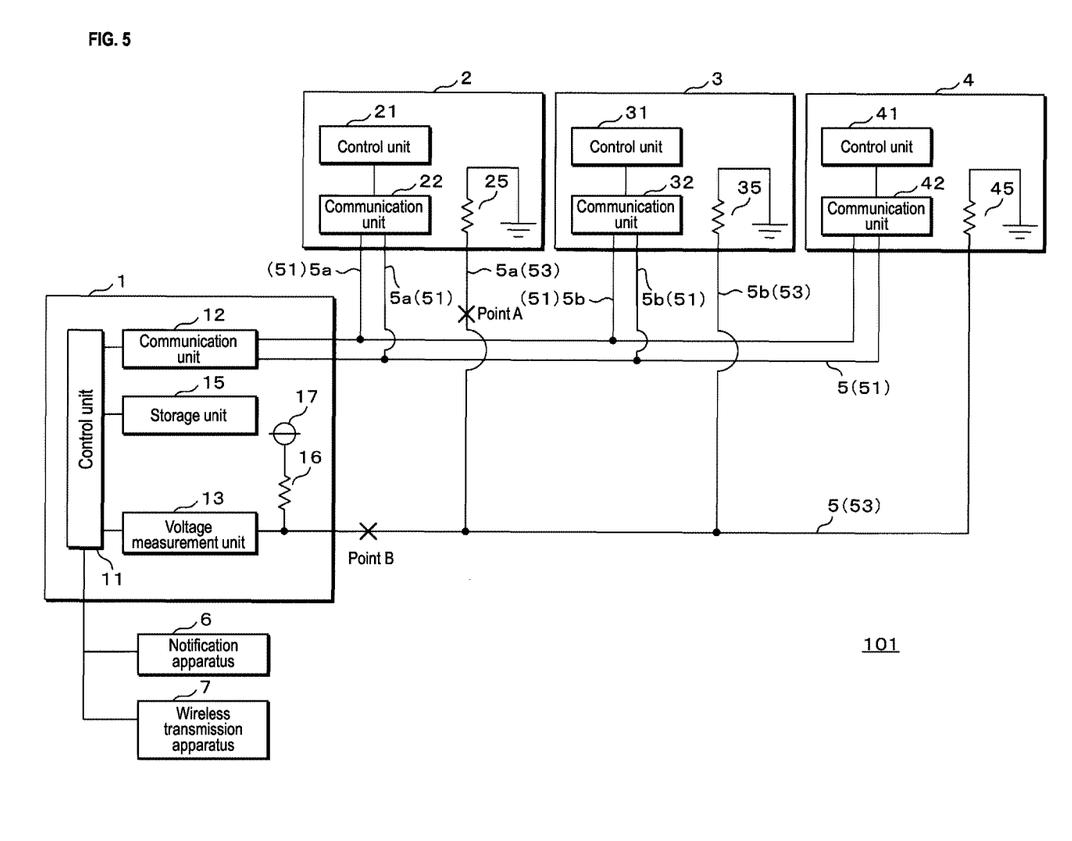
FIG. 5 is a block diagram showing a configuration of a communication system according to Embodiment 3 of the present invention.

FIG. 5 is a block diagram showing a configuration of a communication system 101 according to Embodiment 3 of the present invention. As shown in FIG. 5, in the communication system 101, the communication apparatus 1 is provided with a pull-up resistor 16 and a power source 17, the communication apparatuses 2, 3, and 4 are respectively provided with pull-down resistors 25, 35, and 45.

In the communication apparatus 1, an input port of a voltage measurement unit 13 is provided with the pull-up resistor 16. One end of the pull-up resistor 16 is connected to the power source 17, and the other end of the pull-up resistor 16 is connected to a first conductive member 53 of a communication line 5.

In the communication apparatus 2, one end of the pull-down resistor 25 is connected to the first conductive member 53 of a communication line 5a, and the other end of the pull-down resistor 25 is grounded. In the communication apparatus 3, one end of the pull-down resistor 35 is connected to the first conductive member 53 of a communication line 5b, and the other end of the pull-down resistor 35 is grounded. In the communication apparatus 4, one end of the pull-down resistor 45 is connected to the first conductive member 53 of the communication line 5b, and the other end of the pull-down resistor 45 is grounded.

In the communication system 101 having such a configuration, for example, let the resistance values of the pull-up resistor 16 and the pull-down resistor 25, 35, and 45 all be R [$\Omega$], and let the voltage value of the power source 17 be V [V]. At the time of normal connection, a voltage value V0 measured by the voltage measurement unit 13 is then $V0 = \frac{1}{4} \times V$.

At the time of unauthorized connection, the voltage value measured by the voltage measurement unit 13 is larger than V0. For example, if the first conductive member 53 is disconnected at a point A in the communication line 5a, the voltage value VA measured by the voltage measurement unit 13 is $VA = \frac{1}{3} \times V$. Also, if the first conductive member 53 is disconnected at a point B of the communication line 5 in the vicinity of the communication apparatus 1, then a voltage value VB measured by the voltage measurement unit 13 is VB=V.

In this manner, based on the voltage value of the first conductive member 53 that has been measured by the voltage measurement unit 13, the control unit 11 determines whether or not the voltage of the first conductive member 53 increases with respect to the voltage at the time of normal connection. Accordingly, in the communication system 101, removal of the cover portion is detected by the control unit 11 and the voltage measurement unit 13 detecting an increase in the voltage of the first conductive member 53.

In Embodiment 3, the storage unit 15 stores the voltage value V0 at the time of normal connection that has been measured in advance. The control unit 11 compares the voltage value input by the voltage measurement unit 13 with the stored voltage value V0, and if the input voltage value is larger than the voltage value V0, similarly to Embodiment 1, the control unit 11 outputs predetermined signals to the communication apparatus 6, the wireless transmission apparatus 7, and the communication apparatuses 2, 3, and 4.

In the communication system 101, a voltage is applied to the first conductive member 53, the voltage of the first conductive member 53 is measured, and removal of the cover portion is detected based on an increase in the voltage of the first conductive member 53. Accordingly, it is possible to easily detect connection of an unauthorized apparatus to the communication line 5, 5a, or 5b.

Embodiment 4

Figure 6:
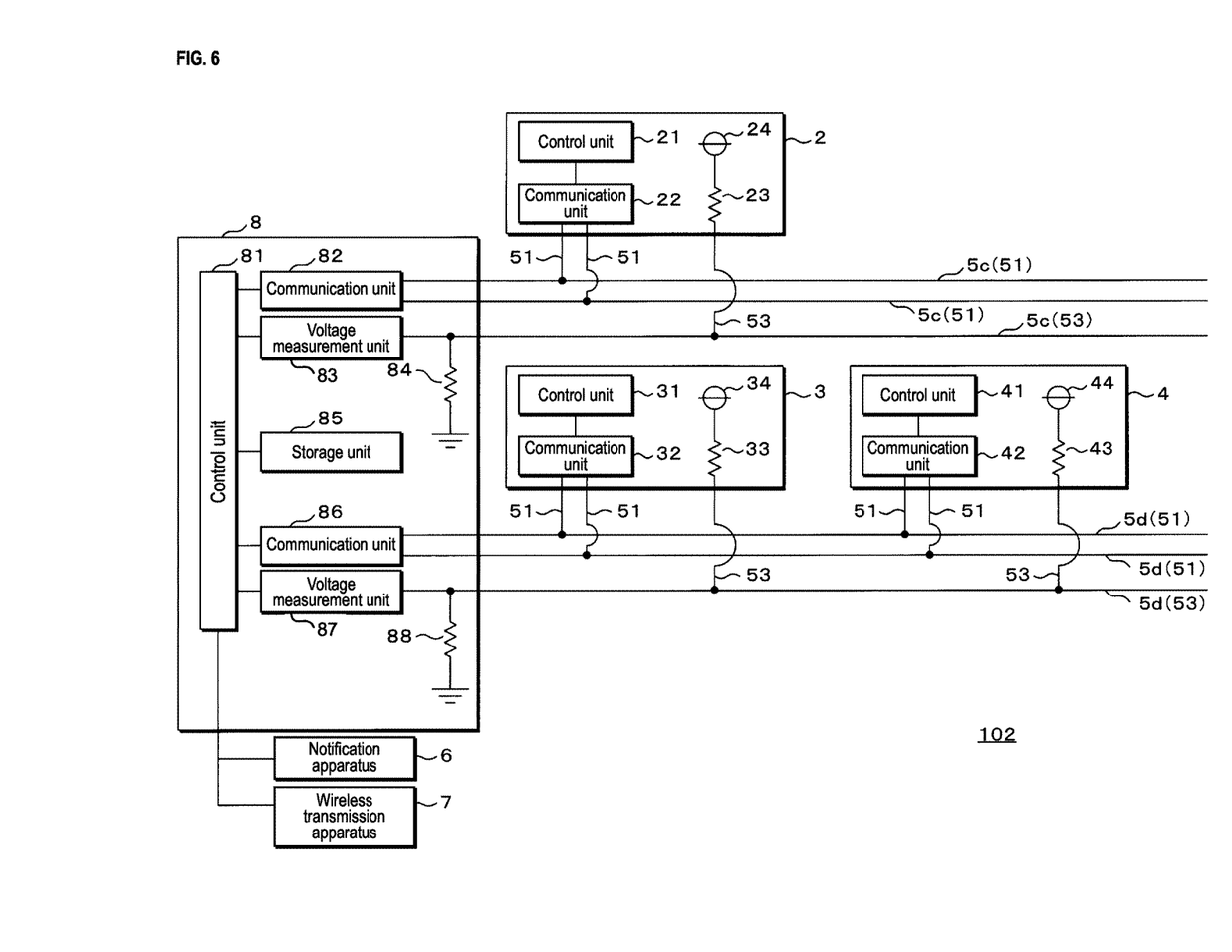
FIG. 6 is a block diagram showing a configuration of a communication system according to Embodiment 4 of the present invention.

FIG. 6 is a block diagram showing a configuration of a communication system 102 according to Embodiment 4 of the present invention. In the description below, reference is made to Embodiment 1 with regard to configurations that are similar to those in Embodiment 1 and their further description will be omitted.

The communication system 102 includes communication apparatuses 2, 3, and 4, and a gateway apparatus 8. The gateway apparatus 8 is connected to bus communication lines 5c and 5d, and relays communication between communication lines 5c and 5d. The communication lines 5c and 5d have the same structure as the communication line 5 in Embodiment 1. The communication apparatus 2 is connected to the communication lines 5c, and the communication apparatus 3 and the communication apparatus 4 are connected to the communication lines 5d. Here, it is preferable to constitute a harness by bundling the communication lines 5c and 5d.

The gateway apparatus 8 includes a control unit 81, communication units 82 and 86, voltage measurement units 83 and 87, pull-down resistors 84 and 88, and a storage unit 85.

The control unit 81 is a CPU, an MPU, or the like, for example, and performs various processes by reading out and executing a control program stored in the storage unit 85 as appropriate. The storage unit 85 has an EEPROM and stores a control program that is executed by the control unit 81, data required for processing, and the like in advance. Also, the storage unit 85 has an SRAM, a DRAM, or the like, and temporarily stores various data produced during execution of a control program by the control unit 81. Note that the storage unit 85 may also be a flash memory.

The communication unit 82 is a communication IC, for example, and is connected to two conductive wires 51 and 51 of the communication lines 5c. The communication unit 82 transmits signals to the conductive wires 51 and 51 in response to an instruction received from the control unit 81, and outputs signals received from the conductive wires 51 and 51 to the control unit 81.

An input port of the voltage measurement unit 83 is connected to the first conductive member 53 of the communication line 5c. Also, the input port of the voltage measurement unit 83 is provided with the pull-down resistor 84. One end of the pull-down resistor 84 is connected to the first conductive member 53 of the communication line 5c, and the other end of the pull-down resistor 84 is grounded. The voltage measurement unit 83 measures the voltage of the first conductive member 53 of the communication line 5c in response to an instruction received from the control unit 81, and outputs the voltage value to the control unit 81.

The communication unit 86 is a communication IC, for example, and is connected to two conductive wires 51 and 51 of the communication lines 5d. The communication unit 86 transmits signals to the conductive wires 51 and 51 in response to an instruction received from the control unit 81, and outputs signals received from the conductive wires 51 and 51 to the control unit 81.

An input port of the voltage measurement unit 87 is connected to the first conductive member 53 of the communication line 5d. Also, the input port of the voltage measurement unit 87 is provided with the pull-down resistor 88. One end of the pull-down resistor 88 is connected to the first conductive member 53 of the communication line 5d, and the other end of the pull-down resistor 88 is grounded. The voltage measurement unit 87 measures a voltage of the conductive member of the communication line 5d in response to an instruction received from the control unit 81, and outputs the voltage value to the control unit 81.

In the communication apparatus 2, the communication unit 22 is connected to conductive wires 51 and 51 of the communication lines 5c. One end of the pull-up resistor 23 is connected to the power source 24, and the other end of the pull-up resistor 23 is connected to the first conductive member 53 of the communication line 5c.

In the communication apparatus 3, the communication unit 32 is connected to conductive wires 51 and 51 of the communication lines 5d. One end of the pull-up resistor 33 is connected to the power source 34, and the other end of the pull-up resistor 33 is connected to the first conductive member 53 of the communication line 5d.

In the communication apparatus 4, the communication unit 42 is connected to conductive wires 51 and 51 of the communication lines 5d. One end of the pull-up resistor 43 is connected to a power source 44, and the other end of the pull-up resistor 43 is connected to the first conductive member 53 of the communication line 5d.

The communication apparatus 6 and the wireless transmission apparatus 7 are connected to the control unit 81 of the gateway apparatus 8.

With regard to the communication lines 5c and 5d, the control unit 81 determines whether or not the voltage of the first conductive member 53 decreases with respect to the voltage at the time of normal connection, based on the voltage values of the first conductive member 53 that were measured by the voltage measurement units 83 and 87. Accordingly, in the communication system 102, removal of the cover portion is detected by the control unit 81 and the voltage measurement units 83 and 87 detecting a decrease in the voltage of the first conductive member 53 with regard to the communication lines 5c and 5d.

In Embodiment 4, the storage unit 15 stores the voltage values V0 at the time of normal connection that were measured in advance with regard to the communication lines 5c and 5d. For example, the control unit 81 compares the voltage value input by the voltage measurement unit 83 with the stored voltage value V0 of the communication line 5c at the time of normal connection, and compares the voltage value input by the voltage measurement unit 87 with the stored voltage value of the communication line 5d at the time of normal connection. If any one of the input voltage values is smaller than the voltage value V0, similarly to Embodiment 1, the control unit 81 outputs predetermined signals to the notification apparatus 6, the wireless transmission apparatus 7, and the communication apparatuses 2, 3, and 4.

In the communication system 102, a voltage is applied to the first conductive member 53 of the communication lines 5c and 5d, the voltage of the first conductive member 53 is measured, and removal of the cover portion is detected based on a decrease in the voltage of the first conductive member 53 of any one of the communication lines 5c and 5d. Accordingly, it is possible to easily detect connection of an unauthorized apparatus to the communication line 5c or 5d.

Although configurations in which the communication lines 5 are used were described in Embodiments 3 and 4, the communication line 50 may also be used. If the communication line 50 is used, it is sufficient that a voltage is applied to the second conductive member and the voltage of the second conductive member is measured. In Embodiment 4, a configuration may also be adopted in which a pull-up resistor and a pull-down resistor are provided as in Embodiment 3 and removal of a cover portion is detected based on an increase in the voltage. In Embodiment 4, the number of buses is not limited to two, and may be set as appropriate.

Although configurations in which the number of communication apparatuses is four were described in the above-described embodiments, the number of communication apparatuses is not limited to four, and may also be set arbitrarily. The number of conductive wires 51 is not limited to two, and may also be one, three or more. The notification apparatus 6 may also give alarm.

Although in the above-described embodiments, the control units 11 and 81 transmit predetermined signals to the communication apparatuses 2 to 4 when removal of the cover portion is detected, the control unit 11 and 81 may also transmit a predetermined signal to one or two of the communication apparatuses 2 to 4. A configuration may also be adopted in which if removal of the cover portion is detected, the control units 11 and 81 stop at least one or all of the communication functions of their communication units 12, 82, and 86.

In the above-described embodiments, a configuration may also be adopted in which, instead of the voltage value V0 at the time of normal connection, a correlational relationship between a disconnection location and the voltage value of the first conductive member 53 or the second conductive member 55 is measured in advance, and a table or the like showing the measured correlational relationship is stored in the storage unit 15. In this manner, a location at which the first conductive member 53 or the second conductive member 55 is disconnected can be specified based on the voltage values input by the voltage measurement units 13, 83, and 87.

Although in the above-described embodiments, an example was described in which whether or not the cover portion was removed was detected by measuring the voltage of the first conductive member or the second conductive member 55, whether or not the cover portion of the communication line 5 was removed may also be detected by measuring the electric current or the power of the first conductive member 53. Also, whether or not the cover portion of the communication line 50 was removed may also be detected by measuring the electric current or the power of the second conductive member 55.

Although in the above-described embodiments, an example was described in which with regard to the communication line 5, the first conductive member 53 completely covers the outer circumference of the first insulating member 52, a configuration may also be adopted in which in the communication line 5, the first conductive member 53 extends along the full length of the communication line 5 so as to cover a portion of the outer circumference of the first insulating member 52. Similarly, in the communication line 50, the second conductive member 55 is not limited to completely covering the outer circumference of the second insulating member 53, and may extend along the full length of the communication line 50 so as to cover a portion of the outer circumference of the second insulating member 54.

Although in the above-described embodiments, examples were described in which the voltage measurement units 13, 83, and 87 output voltage values to the control unit 11 and 81, a configuration may also be adopted in which the voltage measurement units 13, 83, and 87 detect whether or not the voltage changes with respect to the voltage at the time of normal connection and output the detection result to the control units 11 and 81. Specifically, the voltage measurement units 13, 83, and 87 are provided with comparator circuits, the measured voltages and the voltage at the time of normal connection are compared in the comparator circuits, and signals relating to the comparison results are output to the control units 11 and 81. If the measured voltage is not equal to the voltage at the time of normal connection, the control units 11 and 81 output predetermined signals to the notification apparatus 6, the wireless transmission apparatus 7, and the communication apparatuses 2, 3, and 4.

The disclosed embodiments are to be considered exemplary in all respects and in no way limiting. The scope of the present invention is defined by the scope of the appended claims and not by the above description, and all changes that fall within the same essential spirit as the scope of the claims are included therein.

The invention claimed is:

1. A communication system in which a plurality of communication apparatuses perform communication via communication lines, wherein the communication lines constitute a harness, and include a conductive wire for transferring a signal and a cover portion that covers the conductive wire, the cover portion includes a first insulating member that individually coats the conductive wire and a first conductive member that completely covers an outer circumference of the first insulating member, a voltage is applied to the first conductive member, the communication system comprising:

a detection unit that includes a voltage measurement unit for measuring the voltage of the first conductive member and a pull-down resistor connected to an input port of the voltage measurement unit, and that is for detecting whether or not the cover portion has been removed, by measuring the voltage of the first conductive member, the pull-down resistor is connected to the first conductive member, in the plurality of communication apparatuses, any communication apparatus that does not include the detection unit is provided with a pull-up resistor, and wherein the voltage is applied to the first conductive member via the pull-up resistor.

2. The communication system according to claim 1, wherein the cover portion further includes a second insulating member that covers an outer circumference of the first conductive member, and a second conductive member that covers an outer circumference of the second insulating member.

3. The communication system according to claim 1, comprising:

a notification unit for giving a notification if the detection unit detects removal of the cover portion.

4. The communication system according to claim 1, comprising:

a wireless transmission unit for performing wireless transmission to the outside if the detection unit detects removal of the cover portion.

5. The communication system according to claim 1, comprising:

a stop unit for stopping communication performed by at least one of the plurality of communication apparatuses if the detection unit detects removal of the cover portion.

6. The communication system according to claim 1, wherein one of the plurality of communication apparatuses is connected to other communication apparatuses in the plurality of communication apparatuses via the plurality of communication lines, and serves as a gateway apparatus for relaying communication between the plurality of communication lines, and the detection unit is provided in the gateway apparatus.

7. The communication system according to claim 1, wherein the detection unit is provided in at least one of the plurality of communication apparatuses.

8. A communication system in which a plurality of communication apparatuses perform communication via communication lines, wherein the communication lines constitute a harness, and include a conductive wire for transferring a signal and a cover portion that covers the conductive wire, the cover portion includes a first insulating member that individually coats the conductive wire and a first conductive member that completely covers an outer circumference of the first insulating member, a voltage is applied to the first conductive member, the communication system comprising:

a detection unit that includes a voltage measurement unit for measuring the voltage of the first conductive member and a pull-up resistor connected to an input port of the voltage measurement unit, and that is for detecting whether or not the cover portion has been removed, by measuring the voltage of the first conductive member, wherein the voltage is applied to the first conductive member via the pull-up resistor, in the plurality of communication apparatuses, any communication apparatus that does not include the detection unit is provided with a pull-down resistor, and the pull-down resistor is connected to the first conductive member.

9. A communication system in which a plurality of communication apparatuses perform communication via communication lines, wherein the communication lines constitute a harness, and include a conductive wire for transferring a signal and a cover portion that covers the conductive wire, the cover portion includes a first insulating member that individually coats the conductive wire, a first conductive member that completely covers an outer circumference of the first insulating member, a second insulating member that covers an outer circumference of the first conductive member, and a second conductive member that covers an outer circumference of the second insulating member, a voltage is applied to the second conductive member, the communication system comprising:

- a detection unit that includes a voltage measurement unit for measuring the voltage of the second conductive member and a pull-down resistor connected to an input port of the voltage measurement unit, and that is for detecting whether or not the cover portion has been removed, by measuring the voltage of the second conductive member,
- the pull-down resistor is connected to the second conductive member,
- in the plurality of communication apparatuses, any communication apparatus that does not include the detection unit is provided with a pull-up resistor, and
- wherein the voltage is applied to the second conductive member via the pull-up resistor.

10. A communication system in which a plurality of communication apparatuses perform communication via communication lines, wherein the communication lines constitute a harness, and include a conductive wire for transferring a signal and a cover portion that covers the conductive wire, the cover portion includes a first insulating member that individually coats the conductive wire, a first conductive member that completely covers an outer circumference of the first insulating member, a second insulating member that covers an outer circumference of the first conductive member, and a second conductive member that covers an outer circumference of the second insulating member, a voltage is applied to the second conductive member, the communication system comprising:

- a detection unit that includes a voltage measurement unit for measuring the voltage of the second conductive member and a pull-up resistor connected to an input port of the voltage measurement unit, and that is for detecting whether or not the cover portion has been removed, by measuring the voltage of the second conductive member,
- wherein the voltage is applied to the second conductive member via the pull-up resistor,
- in the plurality of communication apparatuses, any communication apparatus that does not include the detection unit is provided with a pull-down resistor, and
- the pull-down resistor is connected to the second conductive member.

11. A detection apparatus that is connected to communication lines with which a plurality of communication apparatuses perform communication, wherein the communication lines constitute a harness, and include a conductive wire for transferring a signal and a cover portion that includes an insulating member that individually coats the conductive wire and a conductive member that completely covers an outer circumference of the insulating member, a voltage is applied to the conductive member, the detection apparatus comprising:

- a detection unit that includes a voltage measurement unit for measuring the voltage of the conductive member and a pull-down resistor connected to an input port of the voltage measurement unit, and that is for detecting whether or not the cover portion has been removed, by measuring the voltage applied to the conductive member,
- the pull-down resistor is connected to the conductive member,
- in the plurality of communication apparatuses, any communication apparatus that does not include the detection unit is provided with a pull-up resistor, and
- wherein the voltage is applied to the conductive member via the pull-up resistor.

12. A detection apparatus that is connected to communication lines with which a plurality of communication apparatuses perform communication, wherein the communication lines constitute a harness, and include a conductive wire for transferring a signal and a cover portion that includes an insulating member that individually coats the conductive wire and a conductive member that completely covers an outer circumference of the insulating member, a voltage is applied to the conductive member, the detection apparatus comprising:

- a detection unit that includes a voltage measurement unit for measuring the voltage of the conductive member and a pull-up resistor connected to an input port of the voltage measurement unit, and that is for detecting whether or not the cover portion has been removed, by measuring the voltage applied to the conductive member,
- wherein the voltage is applied to the conductive member via the pull-up resistor,
- in the plurality of communication apparatuses, any communication apparatus that does not include the detection unit is provided with a pull-down resistor, and
- the pull-down resistor is connected to the conductive member.

* * * * *